United States Patent [19]
Naito

[11] Patent Number: 5,911,016
[45] Date of Patent: Jun. 8, 1999

[54] POLARIZATION SCRAMBLER AND INTEGRATED OPTICAL CIRCUIT MAKING USE THEREOF

[75] Inventor: Takao Naito, Kawasaki, Japan

[73] Assignee: Fujitsu Limited, Kawasaki, Japan

[21] Appl. No.: 08/921,338

[22] Filed: Aug. 29, 1997

[30] Foreign Application Priority Data

Jan. 28, 1997 [JP] Japan ................................. 9-014259

[51] Int. Cl.⁶ ........................................................ G02B 6/10
[52] U.S. Cl. ............................................ 385/3; 385/8; 385/9
[58] Field of Search ............................. 385/2, 3, 8, 9, 385/10

[56] References Cited

U.S. PATENT DOCUMENTS 5,748,358   5/1998   Sugamata et al. ........................ 385/3
5,787,211   7/1998   Gopalakrishnan ........................ 385/3

*Primary Examiner*—Hung N. Ngo
*Attorney, Agent, or Firm*—Staas & Halsey

[57] ABSTRACT

A signal light incident onto a first splitter of a polarization scrambler is split into two and propagated through a first and second optical paths, whereby phases of the signal lights are varied in accordance with a voltage applied by first voltage supplier. Further, a polarization of the signal light propagated through at least one of the first and second optical paths is rotated for adjusting a relative polarization angle between the signal lights by first plane-of-polarization rotator. The signal lights having passed through the optical paths are combined by first coupler so that a polarization condition of the incident signal light is scrambled and output. Polarization dispersion is allowed to occur only after the signal light has passed through the plane-of-polarization rotator.

11 Claims, 10 Drawing Sheets

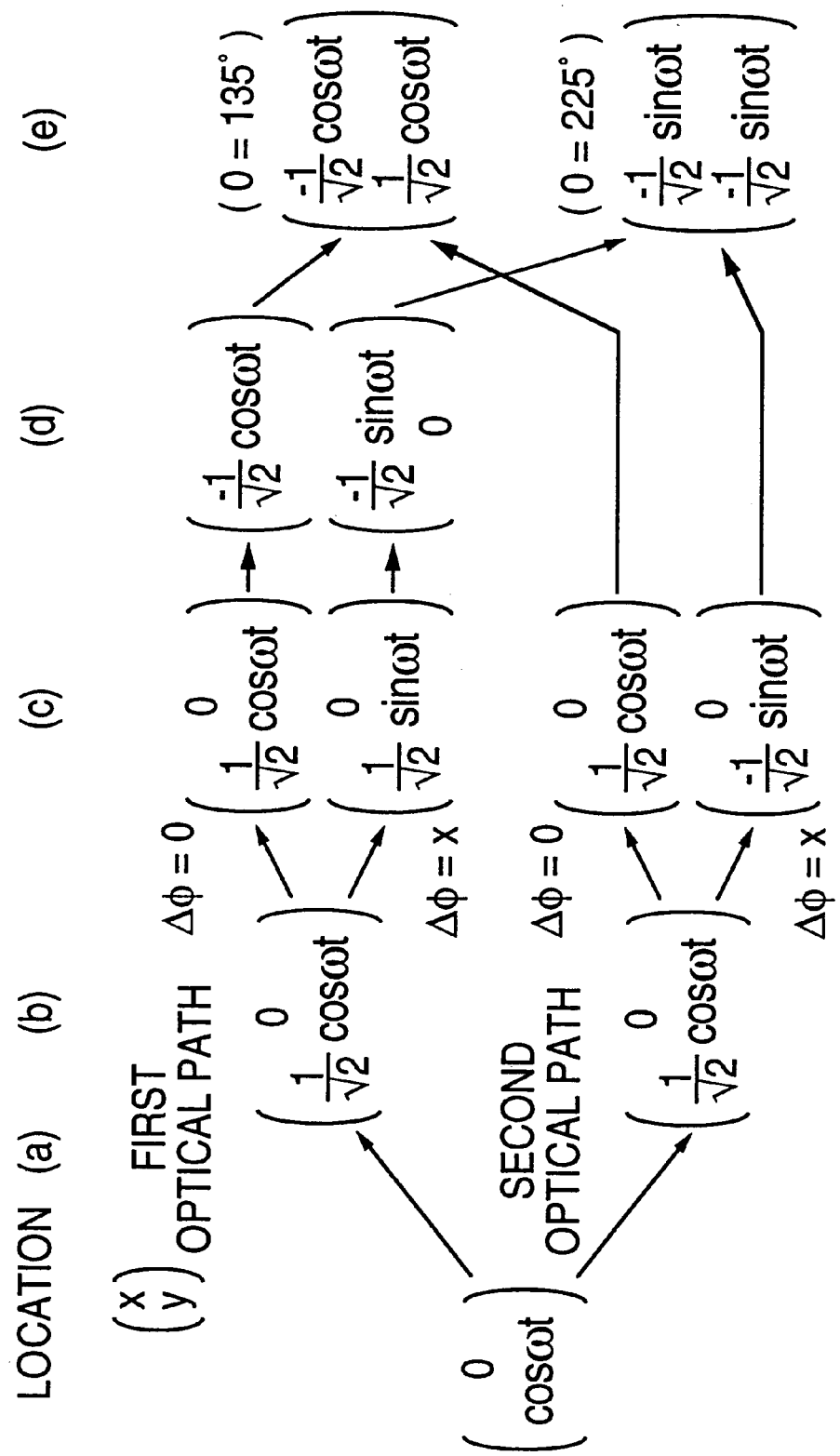

POLARIZATION SCRAMBLER AND INTEGRATED OPTICAL CIRCUIT MAKING USE THEREOF (1) Field of the Invention The present invention relates to a polarization scrambler which scrambles a polarization condition of a transmitted signal light as well as an integrated optical circuit making use thereof, and more specifically a polarization scrambler configured to reduce polarization dispersion as well as an integrated optical circuit which performs phase modulation, intensity modulation and polarization scrambling collectively.

(2) Related Art of the Invention

An optical long-haul transmission system crossing an ocean as wide as thousands of kilometers has conventionally been carried out transmission using optical/electronic regeneration repeaters which convert optical signals into electric signals, and perform retiming, reshaping and regenerating of the signals. Under the present circumstances where progresses have been made in practical use of optical amplifiers, however, examinations are being made on optical amplifier repeated transmission systems which use optical amplifiers as linear repeaters. It is possible, by substituting the optical/electronic regeneration repeaters for optical amplifier repeaters, to remarkably reduce a number of parts disposed in repeaters and lower a cost with no degradation of reliability.

In 1993, M. G. Tayler pointed out a phenomenon that noise light produced by an optical amplifier repeater is dependent on a polarization condition of a signal light, thereby increasing excessive noise light (polarization hole burning). Since the polarization hole burning not only lowers a mean value of ratios of signal light relative to noise light (hereinafter referred to as optical SNR) but also increases fluctuation of optical SNRs, it posed a serious problem in optical amplifier repeater transmission.

The polarization scrambling which varies a polarization condition of a signal light positively on a transmission side has been proposed as a countermeasure for the polarization hole burning phenomenon. The polarization scrambling can be performed, for example, by a method to use a phase modulator, another method to apply a stress from a side surface of an optical fiber or a third method to use two optical sources.

F. Heismann et al, for example, succeeded in 1994 in improving a Q value by 4 dB at a repetition frequency of polarization condition of 40 kHz and 5 dB at 10.66 GHz by polarization scrambling using a phase modulator made of lithium niobate specified for 45° input in a polarization condition (LiNbO$_3$: hereinafter referred to as LN) at a transmission speed of 5.33 Gb/s and a transmission distance of 8100 km. Polarization scrambling at the former repetition frequency which is lower than the transmission speed is referred to as low-speed polarization scrambling, whereas polarization at the latter repetition frequency which is higher than the transmission speed is referred to as high-speed polarization scrambling. The high-speed polarization scrambling has an effect to suppress a fluctuation of an optical SNR due to loss which is dependent on polarization in a transmission line and optical amplifier repeaters, thereby being capable of providing a more remarkably improvement.

Further, attentions are paid, as a method for enlarging capacities of optical transmission systems, to a wavelength division multiplexed (WDM) optical transmission system which transmits optical signals multiplexing two or more different wavelengths through a single transmission line.

A WDM optical amplifier repeater transmission system which is composed by combining the WDM optical transmission system with optical amplifier repeated transmission system described above is capable of amplifying optical signals having two or more different wavelengths collectively by using optical amplifiers, whereby the transmission system can have a simple (economical) configuration, a large capacity and a long transmission distance.

It is important for the WDM optical amplifier repeated transmission system to reduce degradation of transmission characteristic due to a nonlinear effects in a transmission line. For example, the four-wave mixing which is one of the nonlinear effects is produced most frequently when polarization conditions of a plurality of optical signals are coincident with one another. It is therefore possible, by carrying out the high-speed scrambling, to set so that coincidence of polarization conditions of a plurality of optical signals cannot be positively continued.

T. Naito et al., for example, succeeded in 1996 in lowering production ratio of the four-wave mixing by carrying out the high-speed polarization scrambling at a polarization repetition frequency twice as high as a transmission speed and confirmed improvement in a transmission characteristic in experiments of a four-wavelength multiplex transmission system having a transmission speed of 5.33 Gb/s and a transmission distance of 4800 km.

Further, another problem important for the WDM optical amplifier repeater transmission system is to shorten channel intervals, or increase a number of multiplex wavelengths. However, the high-speed polarization scrambling broadens a spectrum of a signal light and constitutes hindrance to set multiple wavelength at a higher density.

N. S. Bergano et al proposed in 1995 a high-speed polarization scrambling which broadens a spectrum of a signal light relatively a little and has a repetition frequency equal to a transmission speed. (See N. S. Bergano et al., '100 Gb/s WDM transmission of twenty 5 Gb/s NRZ data channels over transoceanic distances using a gain flattened amplifier chain', ECOC' 95, Th. A. 3. 1, pp. 967–970, 1995.)

The high-speed polarization scrambling suggested by this proposal is configured to perform polarization scrambling of a polarization condition of a signal light subjected to intensity modulation. However, it is necessary for improving a transmission characteristic to synchronize the intensity modulation of the signals with the polarization scrambling.

Further, N. S. Bergano et al. proposed in 1996 a system which uses a combination of intensity modulation, phase modulation and high-speed scrambling for improving a transmission characteristic. (See N.S. Bergano et al., 'Bit-synchronous polarization and phase modulation scheme for improving the performance of optical amplifier transmission systems', Electronics Letters, Vol. 32, No. 1, PP. 52–54, 1996.)

A polarization scrambler using an LN phase modulator is a hopeful candidate as means for realizing polarization scrambling. However, this polarization scrambler has a defect to produce a difference in transmission delays between optical components having different directions due to a fact that an LN optical waveguide has a refractive index which is largely different dependently on directions. For example, F. Heinsmann et al. reported that the polarization scrambler produced a difference of 16 ps in transmission delays. This difference means a high polarization dispersion and poses a problem since it constitutes a cause for degradation of a transmission characteristic.

As a countermeasure for such a high polarization dispersion, there has been proposed a technique to cancel the polarization dispersion by connecting two LN phase modulators in parallel or in series so that an x axis of one LN optical waveguide is coincident with a y axis of the other LN optical waveguide and selecting voltages having phases reverse to each other for driving the LN modulators, for example, as reported by the inventor in the Autumn Communication Society Meeting by the Institute of Electronics, Information and Communication Engineers. Japan, B-755, 1995 ('Optical amplifier repeater transmission systems with polarization scrambling') and by Y. Fukada et al. in the Communication Society Meeting by the Institute of Electronics, Information and Communication Engineers. Japan, B-1102 ('Analysis of the spectrum of a carrier depolarized by a polarization scrambler'). This technique makes it possible to lower the polarization dispersion and narrow a spectrum of a light subjected to polarization scrambling.

However, the conventional technique described above requires, for preventing polarization dispersion from being caused by the polarization scrambling, combining same phase modulators and inputting an optical signal having a controlled polarization condition to each of the phase modulators, thereby posing problems that it complicates a system configuration for connecting the phase modulators to each other, and that it increases a number of required parts and a number of assembling stages, thereby enhancing a cost and making it difficult to configure a transmission system compact.

When the intensity modulation, phase modulation and polarization scrambling are to be performed collectively, a larger number of light connecting points are required and connection loss is increased, thereby posing problems that an SNR is lowered in transmission light, that a large number of expensive parts are required, that a number of assembling stages such as splices is increased and that the transmission system is expensive as a result.

SUMMARY OF THE INVENTION

The present invention which has been made in view of the problems described above has an object to provide a polarization scrambler which is configured to reduce polarization dispersion, has a simple configuration and can be manufactured at a low cost. Another object of the present invention is to provide an integrated optical circuit which has a polarization scrambling function, a phase modulation function or a intensity modulation function and a simple configuration.

For accomplishing the objects described above, the polarization scrambler according to the present invention comprises a first splitter for splitting an incident signal light into two, a first optical path which is made of a material having an electrooptical effect and receives one of the signal lights split by the first splitter, a second optical path which is made of a material having an electrooptical effect and receives the other signal light split by the first splitter, a first voltage supplier which applies a voltage to at least one of sections set in the first optical path and the second optical path for varying a phase of a signal light propagated through the section, a first coupler which combines signal lights propagated through the first optical path and the second optical path, and a first plane-of-polarization rotator which rotates a polarization of the signal light in at least one of the first optical path and the second optical path between the section and the first coupler for adjusting a relative polarization angle between signal lights propagated through the first optical path and the second optical path.

In the polarization scrambler having the configuration described above, a signal light input into the first splitter is split into two and propagated through the first and second optical paths, and a phase of the signal light is varied dependently on the voltage applied by the first voltage supplier. Further, polarization of the signal light propagated through at least one of the first and second optical paths is rotated by the first plane-of-polarization rotator, whereby the relative polarization angle between the signal lights is adjusted. The signal lights having passed through the first optical path and the second optical path are combined by the first coupler, whereby polarization condition of the incident signal light is scrambled and allowed to emerge.

Accordingly, the polarization dispersion is allowed only within a limited section after the signal light has passed through the plane-of-polarization rotator and it is therefore possible to obtain a polarization scrambler which has a simple configuration and scarecely allows polarization dispersion.

The first plane-of-polarization rotator can be configured so as to adjust the relative polarized wave angle between the signal lights to an angle around 90°. Further, the first plane-of-polarization rotator may comprise a first rotor in one of the first optical path and the second optical path between the section and the first coupler, and the first rotor rotates a polarization of the signal light approximately 90° or comprise a second rotor and a third rotor in the first optical path and the second optical path between the section and the coupler, one of the second rotor and the third rotor rotates a polarization of the signal light approximately 45°, and the other rotor rotates a polarization of the signal light approximately −45°.

Accordingly, the polarization conditions of the signal lights which have passed through the first optical path and the second optical path are adjusted by the first plane-of-polarization rotator so as to have a relative polarization angle around 90°. When a rotor is disposed in each of the first and second optical paths in particular, influences produced by inserting the plane-of-polarization rotator are approximately equalized between the optical paths, thereby making it possible to improve transmission performance for the combined signal light.

The first voltage supplier may be configured to apply voltages having phases reverse to each other to the sections set in the first optical path and the second optical path respectively.

Since the phases of the signal lights propagated through the first optical path and the second optical path are varied in directions different from each other by the first voltage supplier, amplitudes of the applied voltages are narrowed, thereby making it possible to reduce power consumption.

Further, the integrated optical circuit according to the present invention is an integrated optical circuit using the polarization scrambler described above. This integrated optical circuit comprises a third optical path which has an end joined to an input end of the first splitter of the polarization scrambler and the other end for propagating an input signal light to the first splitter, and is made of a material having an electrooptical effect and a first phase modulation voltage supplier which applies a predetermined voltage to a predetermined section set in the third optical path for performing phase modulation of a propagated signal light, wherein the integrated optical circuit is configured to allow a signal light in a linear polarization condition which has components only in one direction relative to the third optical path, perform phase modulation and polarization scrambling collectively and allow the signal light to emerge from the first coupler of the polarization scrambler.

In this integrated optical circuit, a signal light incident onto the third optical path is first subjected to the phase modulation by the first phase modulation voltage supplier while being propagated through the third optical path. Polarization scrambling of the signal light subjected to the phase modulation is carried out by propagating the signal light through the first splitter, the first and second optical path and the first coupler.

Another integrated optical circuit is an integrated optical circuit using the polarization scrambler described above, wherein the integrated optical circuit comprises a second splitter for splitting an incident signal light into two, a fourth optical path which is made of a material having an electrooptical effect and through which one of the signal lights split by the second splitter, a fifth optical path which is made of a material having an electrooptical effect and through which the other signal light split by the second splitter, a first intensity modulation voltage supplier which applies a predetermined voltage to at least one of predetermined sections set in the fourth optical path and the fifth optical path respectively for performing phase modulation of a signal light propagated through the section, and a second coupler which has an output end joined to an input end of the first splitter of the polarization scrambler, combines signal lights propagated through the fourth optical path and the fifth optical path, and output a combined signal light, wherein the integrated optical circuit is configured to allow signal lights in a linear polarization condition which has components only on one direction relative to the fourth optical path and the fifth optical path, perform intensity modulation and polarization scrambling collectively, and allow the signal light to emerge from the first coupler of the polarization scrambler.

In this integrated optical circuit, a signal light incident onto the second splitter is split into two, propagated through the fourth and fifth optical paths, subjected to the phase modulation by the first intensity modulation voltage supplier and combined by the second coupler for intensity modulation. Polarization scrambling is performed by propagating the signal light subjected to the intensity modulation through the first splitter, the first and second optical paths, and the first coupler.

Each of the integrated optical circuits makes it possible to carry out the phase modulation and the polarization scrambling or the intensity modulation and the polarization scrambling collectively and easily with a single integrated optical circuit, and reduce spectral diffusion of a signal light caused by the polarization scrambling. Further, the integrated optical circuit improves an optical SNR of a transmission light since it has optically connected points in a number smaller than that of the optically connected points formed by connecting a polarization scrambler to a phase modulator and an intensity modulator respectively. Furthermore, the integrated optical circuit described above requires no phase adjustment at a stage to connect the component units, reduces a number of required parts, reduces a number of assembling stages such as splices and lowers a necessity to use expensive parts, thereby lowering a cost. In addition, the integrated circuit requires no connecting optical fibers and can be configured compact.

Still another integrated optical circuit according to the present invention comprises phase modulator having an optical path which is made of a material having an electrooptical effect and through which a signal light is propagated, and phase modulation voltage supplier which applies a predetermined voltage to a section set in the optical path for phase modulation of the propagated signal light, a polarization scrambler having an optical path which is made of a material having an electrooptical effect and through which a signal light is propagated, and a voltage supplier which applies a voltage to a section set in the optical path for varying a phase of the signal light propagated through the section, and a first plane-of-polarization rotator which connects an output end of the phase modulator to an input end of the polarization scrambler, rotates a polarization of a signal light propagated through the optical path of the phase modulator and outputs a signal light in a polarization condition where it has components in two directions. Further, the integrated optical circuit may have an electrode which applies a voltage commonly to the phase modulator and the polarization scrambler.

In the integrated optical circuit having the configuration described above, a signal light incident onto the optical path of the phase modulator is first propagated through the optical path for phase modulation by the phase modulation voltage supplier. A polarization of the signal light which has been subjected to the phase modulation is rotated by the first plane-of-polarization rotator, whereby the signal light is set in a polarization condition which has components in two directions. Polarized scrambling is carried out by the voltage supplier by propagating the signal light through the optical path of the polarization scrambler.

With the integrated optical circuit which has a simple configuration utilizing that of the conventional polarization scrambler, it is possible to perform phase modulation and polarization scrambling collectively and easily, improve a transmission characteristic, lower a cost and configure a optical transmission system compact.

Furthermore, a further another integrated optical circuit according to the present invention comprises an intensity modulator comprising a splitter for splitting an incident signal light into two, a first optical path which is made of a material having an electrooptical effect and through which one of signal lights split by the splitter is propagated, a second optical path which is made of a material having an electrooptical effect and through which the other signal light split by the splitter is propagated, an intensity modulation voltage supplier which applies a voltage to at least one of sections set in the first optical path and the second optical path for performing phase modulation of the signal light propagated through the section, and a coupler for combining signal lights propagated through the first optical path and the second optical path, a polarization scrambler having an optical path which is made of a material having an electrooptical effect and through which a signal light is propagated, and a voltage application section which applies a voltage to a section set in the optical path for varying a phase of the signal light propagated through the section, and a first plane-of-polarization rotator which connects an output end of the intensity modulator to an input end of the polarization scrambler, rotates a polarization of a signal light output from the coupler of the intensity modulator, and outputs a signal light in a polarization condition which has components in two directions to the optical path of the polarization scrambler, wherein the integrated circuit is configured to allow a signal light in a linear polarization condition which has components only in one direction to be incident onto the splitter of the intensity modulator, perform intensity modulation and polarization scrambling of the signal light collectively, and allow the signal light to emerge from the polarization scrambler.

In the integrated optical circuit having the configuration described above, a signal light incident onto the splitter of the intensity modulator is split into two and propagated through the first and second optical paths, subjected to phase modulation by the intensity modulation voltage supplier and combined by the coupler for intensity modulation. A polarization of the signal light which has been subjected to the intensity modulation is rotated by the first plane-of-polarization rotator so that the signal light is set in a polarization condition having components in two directions and the signal light is propagated through the optical path of the polarization scrambler for polarization scrambling by the voltage supplier.

With the integrated optical circuit having the simple configuration utilizing the composition of the conventional polarization scrambler, it is possible to perform intensity modulation and polarization scrambling collectively and easily, improve a transmission characteristic, reduce a cost for an optical transmission system and configure it compact.

Moreover, the integrated optical circuit which utilizes the composition of the conventional polarization scrambler may comprise a second plane-of-polarization rotator for rotating approximately 90° a polarization of a signal light emerging from the polarization scrambler, and a compensating polarization scrambler having an optical path which is made of a material having an electrooptical effect and through which a signal light output from the second plane-of-polarization rotator is propagated, and a voltage supplier which applies a predetermined voltage to a predetermined section set in the optical path for varying a phase of the signal light propagated through the section, wherein the compensating polarization scrambler is configured to compensate polarization dispersion caused by the polarization scrambler.

In the integrated optical circuit having the configuration described above, a polarization of the signal light emerging from the polarization scrambler is rotated approximately 90° by the second plane-of-polarization rotator, whereby the components in the two directions in the optical path of the compensating polarization scrambler are converted to each other. When the signal light is propagated through the optical path of the compensating polarization scrambler, a polarization condition is varied so that polarization dispersion is cancelled by the voltage supplier.

Since the polarization dispersion caused by the polarization scrambler is cancelled by the compensating polarization scrambler, it is possible to obtain an integrated optical circuit having more excellent transmission characteristic.

Other objects, characteristics and merits of the present invention will be apparent from the following description of the embodiments made with reference to the accompanying drawings.

BRIEF EXPLANATION OF THE DRAWINGS

FIG. 7 is a diagram descriptive of polarization conditions in the fourth embodiment;

PREFERRED EMBODIMENTS

First, description will be made of a polarization scrambler adopting a phase modulator which is generally used.

Figure 17:
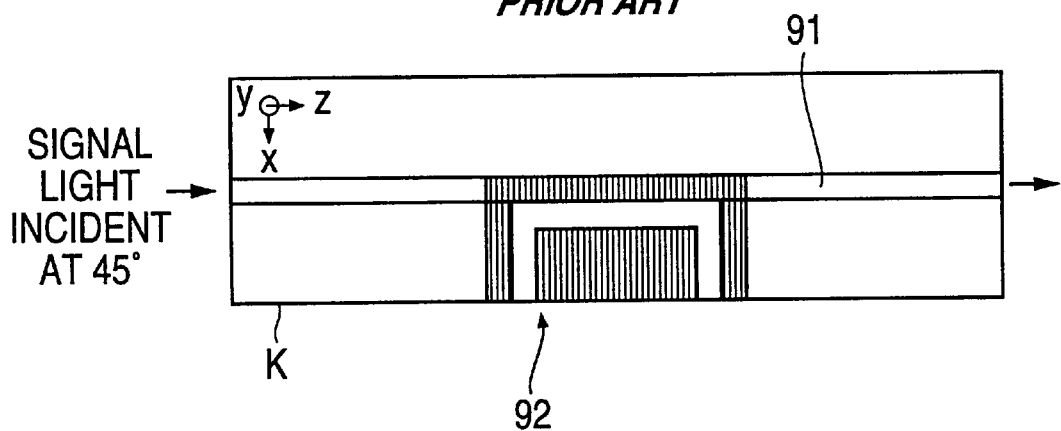
FIG. 17 is a diagram exemplifying a configuration of a polarization scrambler using the conventional phase modulator.

A configuration of the polarization scrambler which uses the conventional phase modulator is exemplified in FIG. 17.

In FIG. 17, the polarization scrambler performs polarization scrambling with a phase modulator having a straight-line type LiNbO$_3$ (LN) optical waveguide 91 on which an electrode pattern 92 is disposed. The LN optical waveguide 91 is made of an LN crystal material having an electrooptical effect which is formed into a straight-line type optical waveguide and varies a refractive index for phase modulation by applying a modulation voltage from the electrode pattern 92 disposed on a surface thereof. The LN optical waveguide 91 receives an optical signal having linear polarization at an azimuth of approximately 45° relative to the x axis and the y axis shown in the drawing, and performs polarization scrambling by varying a phase difference between an x component and a y component of the input light in response to the modulation voltage. A phase difference $\Delta\phi(t)$ is expressed by the following equation:

$$\Delta\phi((t) = \pi/\lambda[n_e^3\gamma_{33} - n_o^3\gamma_{13}]V(t)L\Gamma]$$

wherein the reference $\lambda$ represents a light wavelength, the reference symbol $n_o$ designates a refractive index for the ordinary light, the reference symbol $n_e$ denotes a refractive index for the extraordinary light, the reference symbols $\gamma_{13}$ and $\gamma_{33}$ represent electrooptical constants, the reference symbol $V(t)$ designates a modulation (applied) voltage, the reference symbol L denotes an electrode length and the reference symbol Γ represents a modulation voltage reduction coefficient. The phase difference Δφ(t) is proportional to the modulation voltage as expressed by the equation.

The conventional polarization scrambler described above has a defect that a difference in transmission delays is produced between the components in the different directions due to a fact that the LN optical waveguide 91 has a refractive index which is largely different between the x and y directions.

Now, description will be made of the embodiments of the present invention which has been made taking the defect described above into consideration.

Figure 1:
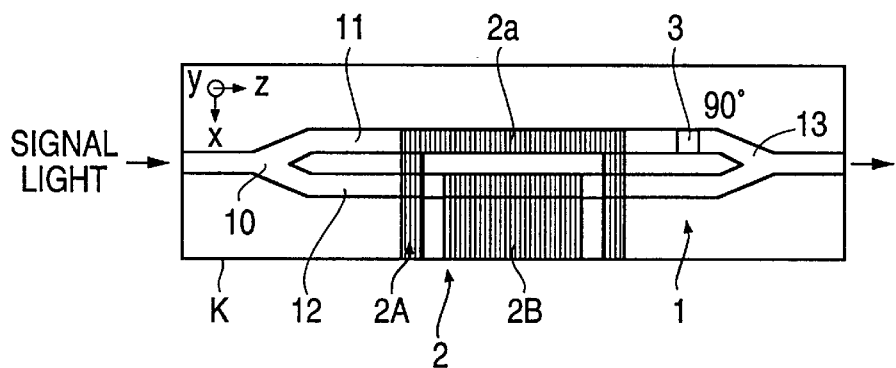
FIG. 1 is a plan view illustrating a configuration of a first embodiment of the polarization scrambler according to the present invention.

FIG. 1 shows a configuration of a first embodiment of the polarization scrambler according to the present invention.

In FIG. 1, the polarization scrambler is composed of a optical waveguide 1 which is configured in the Mach-Zehnder (hereinafter referred to as MZ) form on a base plate K, an electrode pattern 2 which is disposed as a first voltage supplier in a predetermined shape on the base plate K and a plane-of-polarization rotating element 3 which is inserted as a first rotor in a predetermined location in the optical waveguide 1. For description that follows, let us adopt, for the polarization scrambler, a rectangular coordinates system on which a signal light propagation direction is taken as the z axis, a direction perpendicular to the propagation direction in the plane of the base plate K is taken as the x axis and a direction perpendicular to the plane of the base plate K is taken as the y axis.

The optical waveguide 1 is made of a material having an electrooptical effect, for example, lithium niobate $LiNbO_3$ (LN). The optical waveguide 1 is composed of a splitting section 10 functioning as first splitter for splitting an incident light into two, a first optical path 11 and a second optical path 12 through which split optical signals are to be propagated, and a combining section 13 serving as first coupler for combining signal lights from the first and second optical paths 11 and 12.

Figure 2:
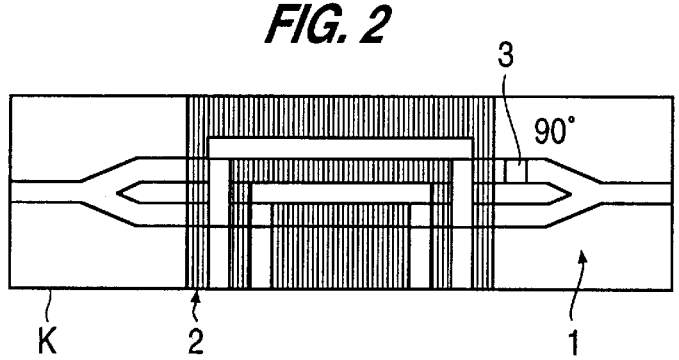
FIG. 2 is a diagram exemplifying a case where the first embodiment uses a coplanar strip line.

The electrode pattern 2 has, for example, a first electrode 2A which varies a refractive index for performing phase modulation of light by applying an electric field to the first optical path 11 and a second electrode 2B. The first electrode 2A is a pattern having an inverted U shape and disposed on the base plate K along the first optical path 11. The second electrode 2B is a rectangular pattern and disposed on the base plate K so as to be enclosed by the first electrode 2A with a predetermined spacing reserved therefrom. Applied to the first electrode 2A is a modulation voltage having a predetermined waveform described later and the second electrode 2B is grounded. Though the first embodiment is not limited to use the electrode pattern 2 which is similar to a microstrip line (asymmetrical coplanar strip line) but may adopt, for example, a coplanar strip line as shown in FIG. 2.

The combination of the optical waveguide 1 and the electrode pattern 2 has a composition similar to that of an LN type light modulator which is generally used.

The plane-of-polarization rotating element 3 is a rotor which output an input signal light after rotating its polarization approximately 90° in one direction. This rotating angle is not limited to 90° but may be around 90°, or concretely on the order of 90±10°. The plane-of-polarization rotating element 3 is inserted, for example, in the course of the first optical path. The inserting location is selected between the electrode pattern 2 and the combining section 13. As an inserting method, it is conceivable to insert the plane-of-polarization rotating element 3 prepared as an independent part into the optical waveguide 1 which is preliminarily formed or to form the optical waveguide 1 integrally with the plane-of-polarization rotating element 3.

Now, description will be made of functions of the first embodiment.

Figure 3:
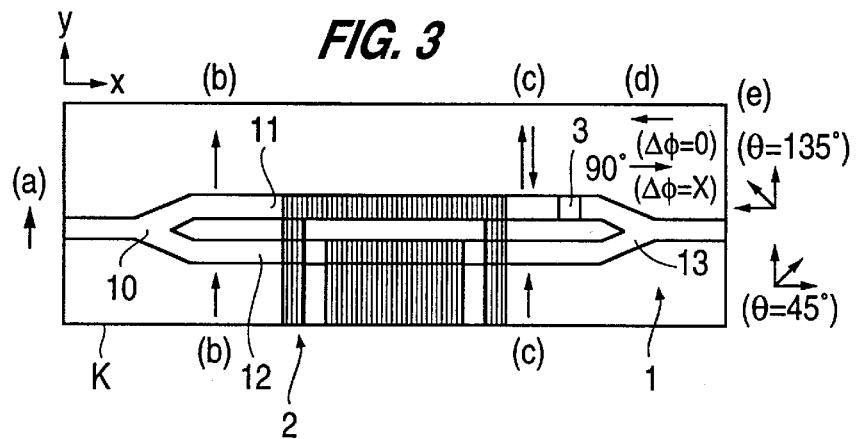
FIG. 3 is a diagram descriptive of polarization conditions in the first embodiment.

First, a signal light emitted from a light transmitter (not shown) or the similar apparatus is incident onto the splitting section 10 of the optical waveguide 1. The incident signal light is controlled, for example, so that its polarization condition is in a vertical linear polarization (in the direction of the y axis) as indicated by a vector at a location (a) in FIG. 3. In FIG. 3, polarization conditions of the incident light at various location of the optical waveguide 1 are indicated by vectors on an xy plane. Using a horizontal component (in the direction of the x axis) and a vertical component (in the direction of the y axis), a polarization condition of the incident light is expressed by Equation (1):

$$(x, y)=(0, \cos \omega t) \text{ or } (0, \sin \omega t) \quad (1)$$

wherein the reference symbol ω represents an angular frequency and the reference symbol t designates a time. Though only (0, cos ωt) is used for description that follows, (0, sin ωt) can also be used similarly for consideration of polarization conditions.

The signal light is split into two by the splitting section 10 and led into the first optical path 11 and the second optical path 12. Each of the split signal lights has a power equal to ½ of a power of the incident light. Since each of the signal lights is vertical linear polarization as shown at a location (b) in FIG. 3, or has a polarization condition which remains unchanged from that at the incident stage, and an optical power is proportional to a square of its electric field, each of the polarization conditions of the signal lights is expressed by Equation (2) which is similar to Equation (1):

$$(x, y)=(0, (½)^{1/2} \cos \omega t) \quad (2)$$

Then, phase modulation is performed by propagating the signal lights through the first optical path 11 and the second optical path 12 having the electrode pattern 2. A phase difference is produced between the signal lights since refractive index of the optical waveguide varies dependently on a modulation voltage applied to the electrode pattern 2, and speeds of the signal lights travelling through the first and second optical paths 11 and 12 are made different from each other. When an electric field of the signal light propagated through the first optical path 11 is represented by E1 and an electric field of the signal light propagated through the second optical path 12 is designated by E2, the electric fields E1 and E2 are expressed as follows:

$$E1=\cos(\omega t+\phi 1), E2=\cos(\omega t-\phi 2)$$

wherein the reference symbols φ1 and φ2 represent phases of the signal lights propagated through the first and second optical paths 11 and 12 respectively.

A phase difference Δφ(=φ1 −φ2) is proportional to an applied modulation voltage as described above. The modulation voltage is set so as to periodically vary the phase difference Δφ substantially within a range of 0~π. In the first embodiment, the phase difference Δφ is periodically modulated at 0.768 πsinφrt(ωr: repetition frequency) by applying, for example, a modulation voltage having a sinusoidal wave to the electrode pattern 2. Speaking more concretely, the phase of the signal light propagated through a first optical path 11 is varied dependently on a modulation voltage applied to the a first electrode 2A, whereas the phase of the signal light propagated through the second optical path 12 remains substantially constant since the second electrode 2B is grounded. Polarization conditions of the signal lights which have been subjected to the phase modulation are shown at a location (c) in FIG. 3. The polarization condition of the signal light propagated through the first optical path 11 is shown as a condition wherein a substantial phase difference $\Delta\phi$ becomes 0 or $\pi$ and this phase difference is used also for description that follows. These polarization conditions are expressed as follows:

$$\text{In the first optical path}\,(x, y) = (0, (1/2)^{1/2}\cos\omega t)[\Delta\phi = 0] \quad (3)$$

$$= (0, -(1/2)^{1/2}\cos\omega t)[\Delta\phi = \pi]$$

$$\text{In the second optical path}\,(x, y) = (0, 1/2)^{1/2}\cos\omega t)[\Delta\phi = 0 \sim \pi]$$

Out of the signal lights which have been subjected to the phase modulation, the signal light propagated through the first optical path 11 is input into the plane-of-polarization rotating element 3 and its polarization is rotated approximately 90°. Generally speaking, a conversion for rotating a polarization at an angle of $\alpha°$ can be expressed by a matrix $R(\alpha)$ represented by the following numeral 1.

$$R(\alpha) = \begin{pmatrix} \cos\alpha & -\sin\alpha \\ \sin\alpha & \cos\alpha \end{pmatrix} \qquad [\text{Numeral 1}]$$

A polarization condition of a signal light output from the plane-of-polarization rotating element 3 is shown at a location (d) in FIG. 3. This condition is expressed as follows:

$$(x, y) = (-(1/2)^{1/2}\cos\omega t, 0)[\Delta\phi = 0] \quad (4)$$

$$= ((1/2)^{1/2}\cos\omega t, 0)[\Delta\phi = \pi]$$

Then, the signal light having passed through the plane-of-polarization rotating element 3 and the signal light propagated through the second optical path 12 are combined and output. The combined signal light is in a linear polarization wherein an angle $\theta$ formed between the x axis and a polarization is 135° at phase difference $\Delta\phi=0$ and the angle $\theta$ formed between the x axis and the polarization is 45° at a phase difference of $\Delta\phi=\pi$. This polarization condition is expressed as follows:

$$(x, y) = (-1/2\cos\omega t, 1/2\cos\omega t)[\Delta\phi = 0] \quad (5)$$

$$= (1/2\cos\omega t, 1/2\cos\omega t)[\Delta\phi = \pi]$$

Polarization scrambling of the signal light transmitted from a light transmitter or the similar apparatus is performed as described above. In the first embodiment, polarization dispersion caused by the polarization scrambler is limited within a section from the plane-of-polarization rotating element 3 to an exit end of the combining section 3. In other words, signal lights are composed only of components having the same direction (the direction of the y axis) and polarization dispersion is scarecely caused in the splitting section 10, the first optical path 11 and the second optical path 12, whereas the signal lights have x axis components and y axis components, and polarization dispersion is caused only in a section from the plane-of-polarization rotating element 3 to the exit end of the combining section 13. Accordingly, the first embodiment is capable of reducing the polarization dispersion below approximately ⅓ of that caused in the conventional polarization scrambler which has an optical path length equal to that of the first embodiment and uses a phase modulator receiving an incident light at an angle of 45° (having the x and y components).

As understood from the foregoing description, the first embodiment makes it possible to provide a polarization scrambler which has a simple on configuration and allows a little polarization dispersion by disposing a plane-of-polarization rotating element 3 in the optical waveguide 1 having a composition similar to that of the general LN type light modulator. On an assumption that the optical waveguide 1 and the plane-of-polarization rotating element 3 can be integrated with each other, it is possible to manufacture the polarization scrambler preferred as the first embodiment through steps which are substantially the same as those for the conventional LN type light modulator.

Now, description will be made of a second embodiment.

In the second embodiment, a location for inserting a plane-of-polarization rotating element is selected in a second optical path 12 in place of the first optical path 11 which is selected as the location for inserting the plane-of-polarization rotating element 3 in the first embodiment.

Figure 4:
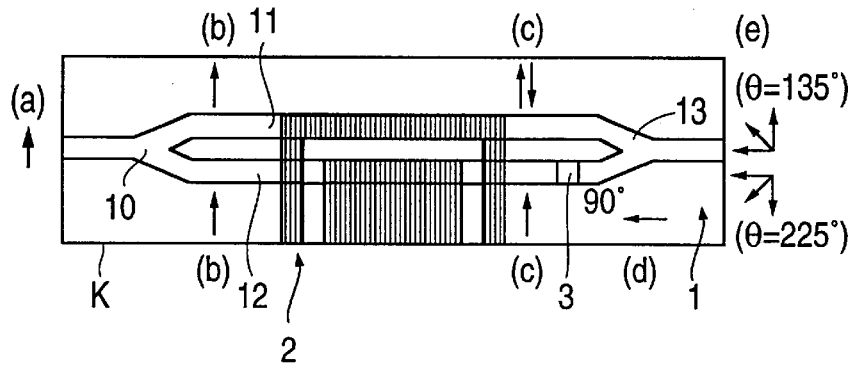
FIG. 4 is a plan view illustrating a configuration of a second embodiment of the polarization scrambler according to the present invention and polarization conditions therein.

FIG. 4 shows a configuration of the second embodiment and polarization conditions of a signal light.

Concretely speaking of a difference between the polarization scrambler preferred as the second embodiment and the first embodiment with reference to FIG. 4, a plane-of-polarization rotating element 3 is inserted in a second optical path 12 between a combining section 13 and an electrode pattern 2 in the second embodiment. The plane-of-polarization rotating element 3 is the same as that used in the first embodiment but is disposed at a different location. Other members of the second embodiment remain unchanged from those of the first embodiment and will not be described in particular. Like the first embodiment, the second embodiment is not limited to the electrode pattern 2 which is of a microstrip line type shown in FIG. 4 but may adopt an electrode pattern of a coplanar strip line type (see FIG. 2).

Now, functions of the second embodiment will be described below.

At steps from the incidence of a signal light onto the splitting section 10 to the phase modulation in the first optical path 11 and the second optical path 12, the polarization scrambler preferred as the second embodiment functions quite the same as the first embodiment, and polarization conditions at various locations are indicated by vectors at locations (a) through (c) and expressed by Equations (1) through (3) described above.

The signal light which has passed under the electrode pattern 2 through the second optical path 12 is input into the plane-of-polarization rotating element 3 and its polarization is rotated approximately 90°. A polarization condition at this time is indicated at a location (d) in FIG. 4 and expressed as follows:

$$(x, y)=(-(\tfrac{1}{2})^{1/2}\cos\omega t, 0)[\Delta\phi=0\sim\pi] \quad (4)'$$

The signal light which has passed through the first optical path 11 and the signal light which has passed through the plane-of-polarization rotating element 3 are combined by the combining section 13 and output. The combined signal light is in a linear polarization where an angle $\theta$ formed between the x axis and a polarization is 135° at a phase difference $\Delta\phi=0$ and an angle $\theta$ formed between the x axis and the polarization is 225° at a phase difference $\Delta\phi=\pi$. This is expressed as follows:

$$(x, y) = (-1/2\cos\omega t, 1/2\cos\omega t)[\Delta\phi = 0] \qquad (5)'$$
$$= (-1/2\cos\omega t, -, 1/2\cos\omega))[\Delta\phi = \pi]$$

The second embodiment having the configuration wherein the plane-of-polarization rotating element 3 is inserted in the second optical path 12 can provide an effect similar to that of the first embodiment.

Now, a third embodiment will be described below.

The third embodiment is characterized in that two plane-of-polarization rotating elements 31 and 32 are disposed in a first optical path 11 and a second optical path 12 respectively in place of the plane-of-polarization rotating element 3 used in the first or second embodiment.

Figure 5:
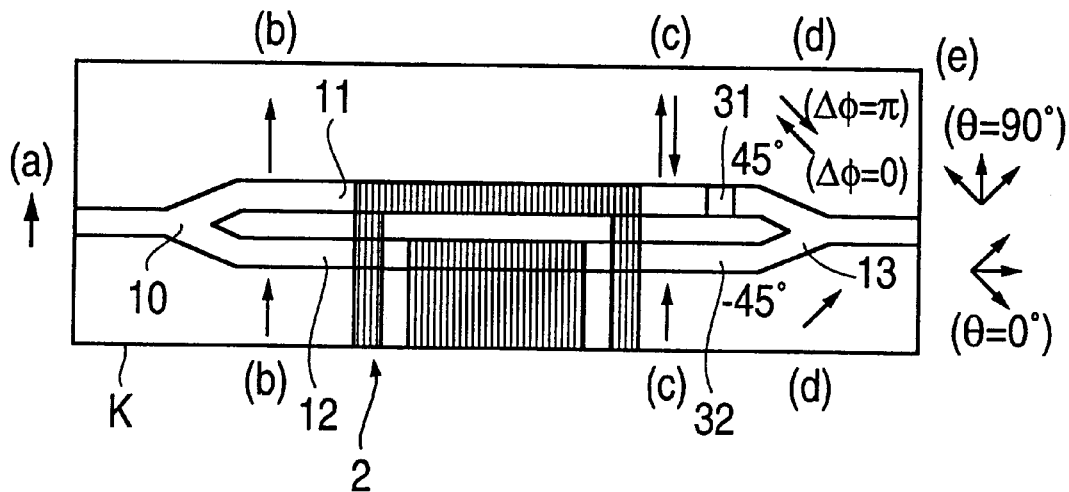
FIG. 5 is a plan view illustrating a configuration of a third embodiment of the polarization scrambler according to the present invention and polarization conditions therein.

FIG. 5 shows a configuration of the third embodiment and polarization conditions of a signal light.

As shown in FIG. 3, a polarization scrambler preferred as the third embodiment has a configuration wherein the plane-of-polarization rotating element 31 is disposed as a second rotor at the location of the plane-of-polarization rotating element 3 in the first embodiment and the plane-of-polarization rotating element 32 is disposed as a third rotor at the location of the plane-of-polarization rotating element 3 in the second embodiment. Other members of the third embodiment are the same as those of the first or second embodiment and will not be described in particular.

The plane-of-polarization rotating element 31 receives a signal light which has passed under an electrode pattern 2 through the first optical path 11 and outputs the signal after rotating its polarization approximately 45°. The plane-of-polarization rotating element 32 receives a signal light which has passed under the electrode pattern 2 through the second optical path 12 and outputs the signal after rotating its polarization approximately −45°. The plane-of-polarization rotating elements 31 and 32 are not limited to the rotating angles of 45° and −45°, but may have a relative rotating angle around 90°, or concretely on the order of 90±10°. The plane-of-polarization rotating elements 31 and 32 can be inserted by a method similar to that for the plane-of-polarization rotating element 3 described above.

Now description will be made of functions of the third embodiment.

At stages from the incidence of the signal light onto the splitting section 10 to the phase modulation in the first optical path 11 and the second optical path 12, the polarization scrambler preferred as the third embodiment functions similarly to the first embodiment, and polarization conditions at various locations are indicated by vectors at locations (a) through (c) in FIG. 5 and expressed by Equations (1) through (3) described above.

The signal light which has passed through the first optical path 11 under the electrode pattern 2 is input into the plane-of-polarization rotating element 31 and its polarization is rotated approximately 45° (according to the matrix R(α=45) described above). A polarization condition at this time is shown at a location (d) in FIG. 5 and expressed as follows:

$$(x, y) = (-1/2\cos\omega t, 1/2\cos\omega t)[\Delta\phi = 0] \qquad (4.1)$$
$$= (1/2\cos\omega t, -1/2\cos\omega t)[\Delta\phi = \pi]$$

Further, the signal light which has passed through the second optical path 12 under the electrode pattern 2 is input into the plane-of-polarization rotating element 32 and its polarization is rotated approximately −45° (according to the matrix R (α=−45) described above). A polarization condition at this time is shown at a location (d) in FIG. 5 and expressed as follows:

$$(x, y)=(\tfrac{1}{2}\cos\omega t, \tfrac{1}{2}\cos\omega t) [\Delta\phi=0\sim\pi] \qquad (4.2)$$

The signal lights having passed through the plane-of-polarization rotating elements 31 and 32 are combined by the combining section 13 and output. The combined signal light is linear polarization in a condition where an angle θ formed between the x axis and the polarization 90° at phase difference Δφ=0 and the angle formed between the x axis and the polarization is 0° at a phase difference Δφ=π. This polarization condition is expressed as follows:

$$(x, y) = (0, \cos\omega t)[\Delta\phi = 0] \qquad (5)''$$
$$= (\cos\omega t, 0)[\Delta\phi = \pi]$$

The third embodiment performs polarization scrambling of a signal light emitted from a light transmitter or a similar apparatus as described above and is capable of reducing polarization dispersion. Further, the third embodiment is capable of improving a transmission characteristic for the combined signal light since it has a configuration wherein the first optical path 11 and the second optical path are symmetrical, thereby nearly equalizing influences due to the insertion of the plane-of-polarization rotating element in both the optical paths.

Now, a fourth embodiment will be described below.

The fourth embodiment is characterized in that it uses an electrode pattern 2' which has a shape different from that of the electrode pattern adopted in each of the first through third embodiments.

Figure 6:
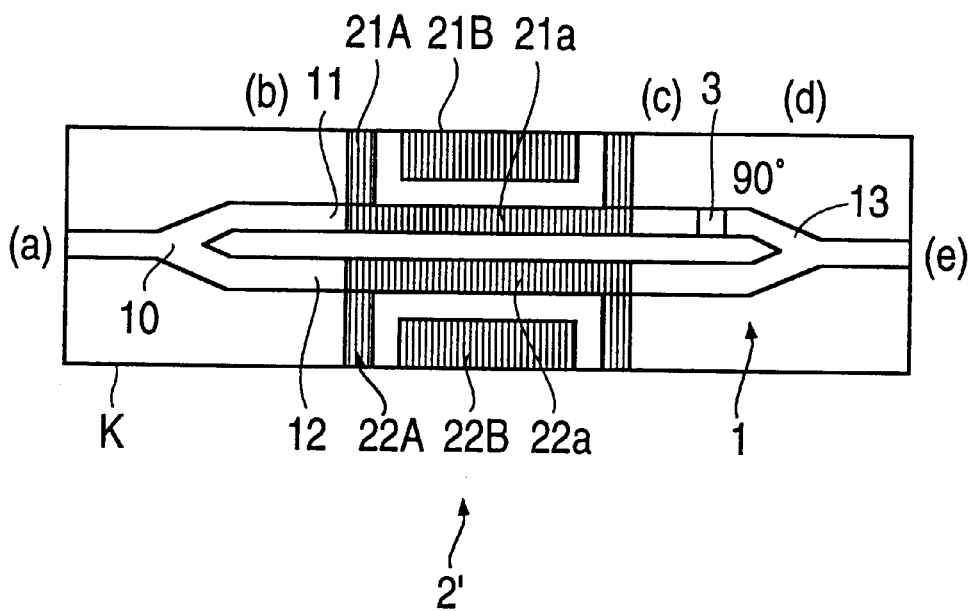
FIG. 6 is a plan view illustrating a configuration of a fourth embodiment of the polarization scrambler according to the present invention.

FIG. 6 shows a configuration of the fourth embodiment.

As shown in FIG. 6, the electrode pattern 2' of the polarization scrambler preferred as the fourth embodiment is composed, unlike the electrode pattern 2, of four electrodes 21A, 21B, 22A and 22B. Members other than the electrode pattern 2' are the same as those of the first embodiment and will not be described in particular.

The electrode pattern 21A is a U-shaped pattern and has a side 21a disposed on a base plate K so as to be along a first optical path 11, whereas the electrode pattern 21B is a rectangular pattern which is disposed on the base plate K so that its periphery is enclosed by the electrode 21A with a predetermined spacing reserved therefrom. In contrast, the electrode 22A is a U-shaped pattern which is disposed on the base plate K along a second optical path 12 so that a side 22a is along a second optical path 12 and the electrode 22a is a rectangular pattern which is disposed on the base plate K so that its periphery is enclosed by the electrode 22A with a predetermined spacing reserved therefrom. Modulation voltages having phases reverse to each other, a waveform which is the same as that of the modulation voltage described above and an amplitude equal to ½ of that of the modulation voltage are applied to the electrodes 21A and 22A, whereas the electrodes 21B and 22B are grounded.

Description will be made of functions of the fourth embodiment.

From a stage where a signal light is incident on the splitting section 10 to a stage where split signal lights are led into the first optical path and the second optical path 12, functions of a polarization scrambler preferred as the fourth embodiment remain unchanged from those of the first, second or third embodiment, but phase modulation performed in each of the optical paths of the fourth embodiment is different from that in the first, second or third embodiment. Since it is difficult to represent polarization conditions of the signal light subjected to phase modulation in the fourth embodiment simply by vectors on the xy plane, functions of the fourth embodiment will be described by expressing the polarization conditions with x and y components of its electricfield.

FIG. 7 shows variations of polarization conditions at various locations in a optical waveguide 1. Locations (a) through (e) correspond to those represented by the same reference symbols in FIG. 6.

A polarization condition of the signal light incident on the polarization scrambler and polarization conditions of signal lights split by the splitting section 10 are the same as those expressed by Equations (1) and (2). In the fourth embodiment which applies modulation voltages to both the first optical path 11 and the second optical path 12, phases of the signal lights passing through the optical paths are varied. Polarization conditions of the signal lights which have passed under the electrode pattern 2' are expressed at a location (c) in FIG. 7. As in the first embodiment, a signal light which has passed through the first optical path 11 is input into the plane-of-polarization element 3 and its polarization is rotated approximately 90°. A polarization condition of the signal light is expressed at a location (d) in FIG. 7. Signal lights which have passed through the optical paths are combined by the combining section 13 and output. The polarization condition of the combined signal light is linear polarization in a condition where an angle θ formed between the x axis and the polarization is 135° at phase difference $\Delta\phi=0$ and the angle formed between the x axis and the polarization θ is 225° at phase difference $\Delta\phi=\pi$ as shown at a location (e) in FIG. 7.

The fourth embodiment which uses the electrode pattern 2' not only provides an effect similar to that obtained by the first embodiment but also permits reducing an amplitude of applied modulation voltages to ½ of that adopted for the first embodiment, thereby reducing electric power consumed by the polarization scrambler.

Figure 8A:
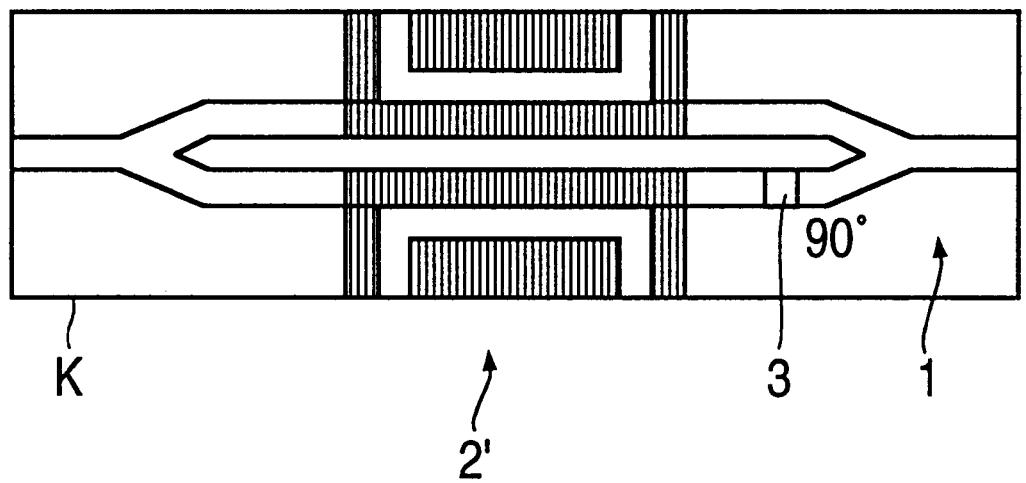
FIGS. 8(A) and 8(B) are diagrams exemplifying a case wherein disposition of a plane-of-polarization rotating element is modified.
Figure 8B:
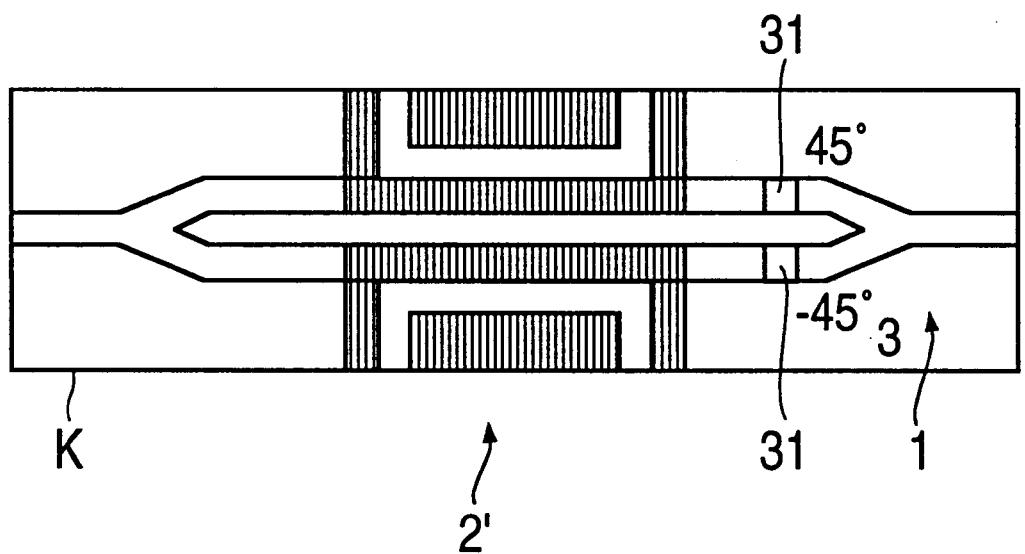
Figure 9A:
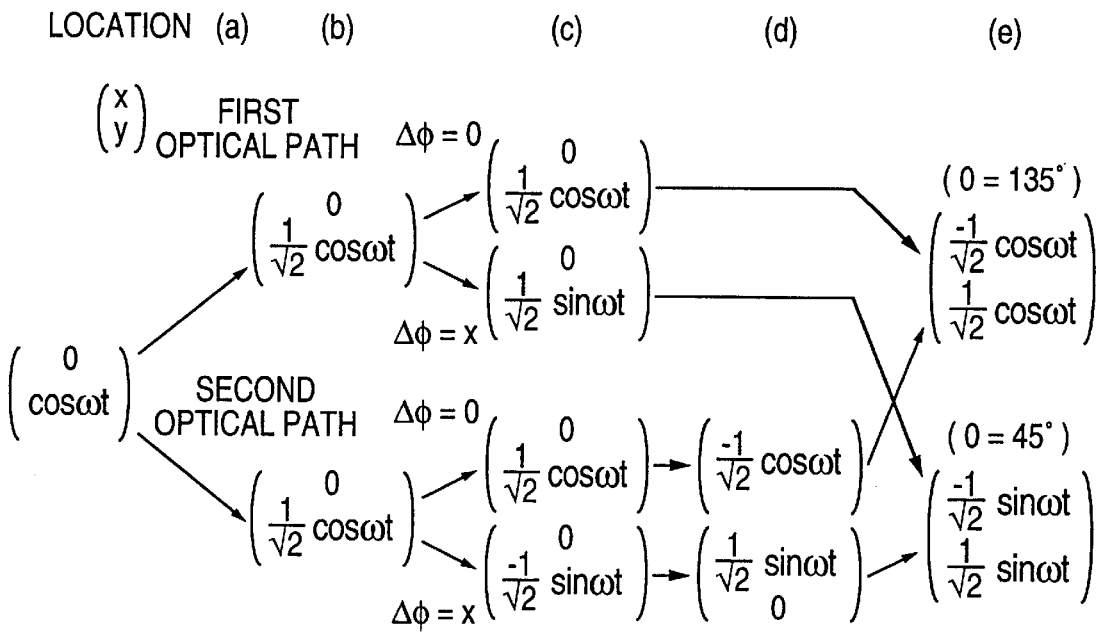
FIGS. 9(A) and 9(B) are diagrams descriptive of polarization conditions in the configurations shown in FIGS. 8(A) and 8(B)
Figure 9B:
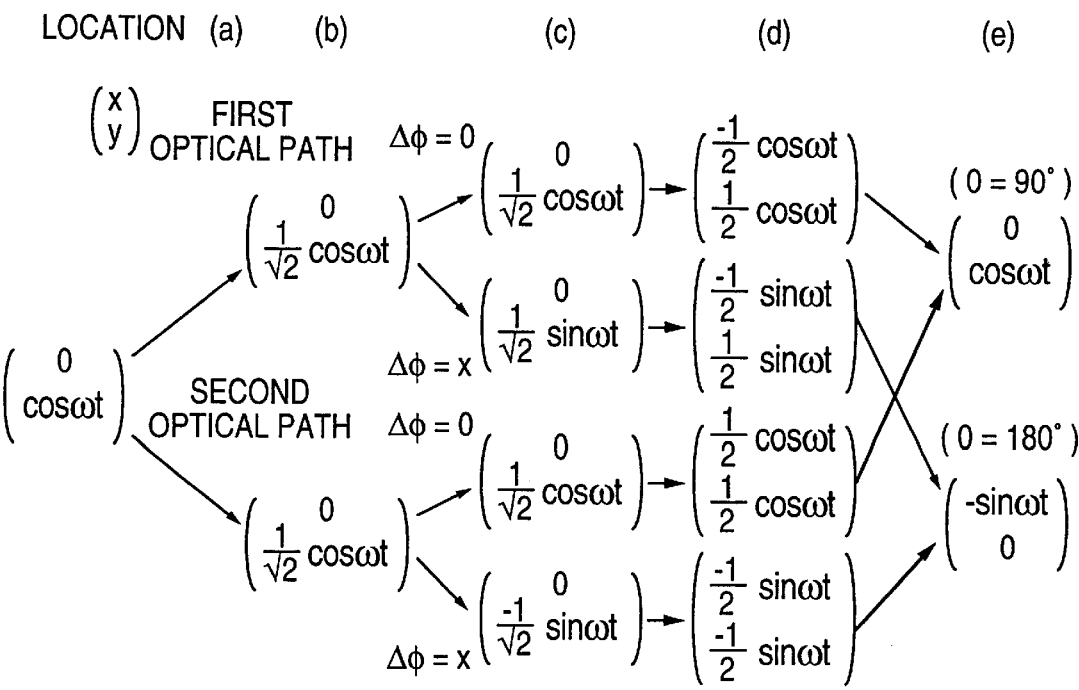

Though the plane-of-polarization rotating element 3 is inserted in the first optical path 11 in FIG. 6 as in the first embodiment (FIG. 1), a composition of the fourth embodiment which uses the electrode pattern 2' is not limited to that shown in FIG. 6. For example, the fourth embodiment may select a composition similar to that of the second embodiment wherein the plane-of-polarization rotating element 3 is inserted in the second optical path 12 as shown in FIG. 8(A) or a composition similar to that of the third embodiment wherein the plane-of-polarization rotating elements 31 and 32 are inserted in the first and second optical paths 11 and 12 respectively as shown in FIG. 8(B). When the fourth embodiment adopts either of these compositions, its functions can be considered similarly. Polarization conditions in the composition shown in FIG. 8(A) are expressed in FIG. 9(A), whereas polarization conditions in the composition shown in FIG. 8(B) are illustrated in FIG. 9(B).

Now, description will be made of a fifth embodiment.

The fifth embodiment is an embodiment of an invention defined by claim 6, or is an integrated optical circuit wherein the polarization scrambler preferred as the second embodiment has an additional phase modulation function for performing phase modulation and polarization scrambling at the same time.

Figure 10:
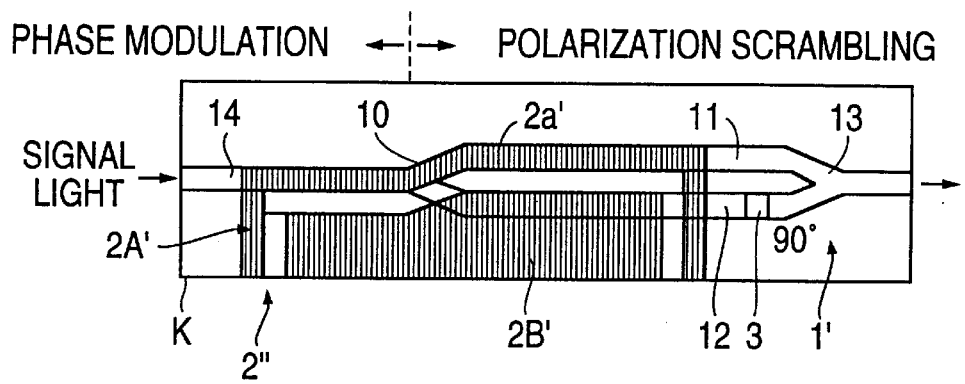
FIG. 10 is a plan view illustrating a configuration of a fifth embodiment of the integrated optical circuit according to the present invention.

FIG. 10 shows a configuration of the fifth embodiment.

The configuration of the integrated optical circuit preferred as the fifth embodiment shown in FIG. 10 is different from that of the polarization scrambler preferred as the second embodiment in that a optical waveguide 1' having a phase modulator 14 as a third optical path is used in place of the optical waveguide 1 and that an electrode pattern 2" has a shape which is selected by modifying the shape of the electrode pattern 2 so as to be adapted to the phase modulator 14. Other members of the fifth embodiment are the same as those of the second embodiment and will not be described in particular.

The optical waveguide 1' is composed by joining a phase modulator 14 which is a optical waveguide having a predetermined length to an input end of the splitting section 10 of the optical waveguide 1 described above. The phase modulator 14 is made of a material having an electrooptical effect which is the same as that for the splitting section 10, first optical path 11, second optical path 12 and combining section 13, and the optical waveguide 1' is formed integrally as a whole.

The electrode pattern 2" has a first electrode 2A' which applies an electric field to the phase modulator 14, splitting section 10 and first optical path 11 for performing phase modulation of light, and a second electrode 2B'. The first electrode 2A' is a pattern which has a nearly U-shape and is disposed on the base plate K so that one side 2a' is along the phase modulator 14, splitting section 10 and first optical path 11. The second electrode 2B' is a nearly rectangular patter which is disposed on the base plate K so that its periphery is enclosed by the first electrode 2A' with a predetermined spacing reserved therefrom. A modulation voltage which is similar to that used in the second embodiment is applied to the first electrode 2A' and the second electrode 2B' is grounded. Phase modulation of a signal light passing through the phase modulator 14 is varied dependently on a length of a portion of the first electrode 2A' disposed along the phase modulator 14. Accordingly, the length of this portion is set adequately in accordance with phase modulation required for phase modulation which is performed together with polarization scrambling. The electrode pattern 2" functions as first modulation voltage supplier and first voltage supplier as described above. Though the electrode pattern 2" is described as the microstrip line type, a coplanar strip line may be used as the electrode pattern 2".

In the integrated optical circuit, a signal light transmitted from a light transmitter or the similar apparatus is controlled to a vertical linear polarization and incident on the optical waveguide 1'. The incident signal light is subjected to phase modulation by the phase modulator 14. The phase modulation performed by this phase modulator 14 is the same as that performed by the conventional phase modulator and will not be described in particular. The signal light which is subjected to the phase modulation is split by the splitting section 10 into two, led into the first optical path 11 and the second optical path 12, whereafter a signal light which is subjected to phase modulation in the first optical path 11, and a signal light which has passed through the second optical path 12 and the plane-of-polarization rotating element 3 are combined by the combining section 13 to perform polarization scrambling.

Figure 18:
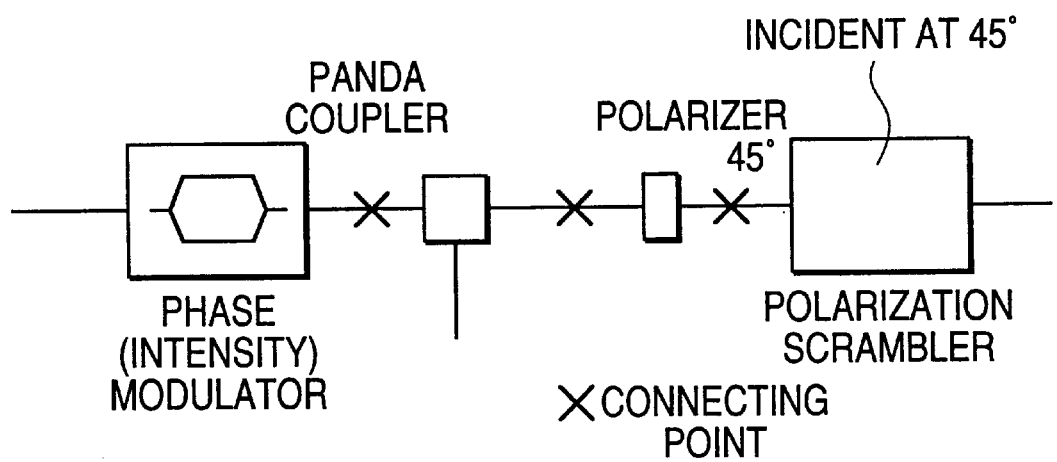
FIG. 18 is a diagram exemplifying a conventional configuration for performing phase modulation or intensity modulation and polarization scrambling collectively.

As understood from the foregoing description, the fifth embodiment permits composing an integrated optical circuit which has both a phase modulation function and a polarization scrambling function, thereby easily enabling to obtain means for performing a combination of phase modulation and polarization scrambling which has conventionally been proposed for reducing spectral diffusion due to polarization scrambling. Compared with a case where a phase (or intensity) modulator, a panda coupler, a polarizer and a polarization scrambler are connected to one another, for example, with polarization-preserving fibers as in the conventional configuration shown in FIG. 18, the integrated optical circuit reduces optically connected points and connection loss, thereby improving optical SNR in a transmission light. Further, the integrated optical circuit requires no phase adjustment at a stage to connect the component units, reduces a number of required parts and a number of assembling steps such as splices, and lowers necessity to use expensive parts, thereby lowering a cost for a transmission system. In addition, the integrated optical circuit requires no optical fiber for connecting parts and can be configured compact.

Though the fifth embodiment has the composition wherein the plane-of-polarization rotating element 3 is disposed in the second optical path 12, it may have a composition in which the plane-of-polarization rotating element 3 is disposed in the first optical path 11 as in the first embodiment or a composition wherein the plane-of-polarization rotating elements 31 and 32 are disposed in the first and second optical paths 11 and 12 respectively as in the third embodiment.

Now, a sixth embodiment will be described below.

The sixth embodiment is an embodiment of an invention defined by claim 8 or 9 and is an integrated optical circuit which integrates a polarization scrambler of the conventional straight line type (FIG. 19) with a phase modulator.

Figure 11:
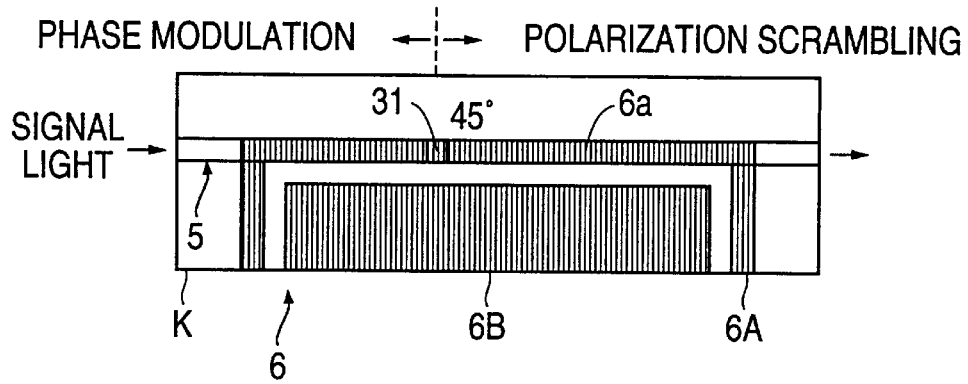
FIG. 11 is a plan view illustrating a configuration of a sixth embodiment of the integrated optical circuit according to the present invention.

FIG. 11 shows a configuration of the sixth embodiment.

The integrated optical circuit is composed, as shown in FIG. 11, of a straight line type optical waveguide 5 formed on a base plate K, an electrode pattern 6 which is disposed in a predetermined shape on the base plate K, and a plane-of-polarization rotating element 31 which is inserted in the middle portion of the optical waveguide 5 and functions as first plane-of-polarization rotator (the same as that used in the third embodiment).

The optical waveguide 5 is made of a material having an electrooptical effect which is similar to that selected for the optical waveguide 1 described above. The plane-of-polarization rotating element 31 is inserted in the middle portion of the optical waveguide 5. The optical waveguide 5 functions as an optical path of phase modulator and as an optical path of polarization scrambler.

The electrode pattern 6 has a first electrode 6A and a second electrode 6B. The first electrode 6A is a U-shaped pattern which is disposed on the base plate K so that a side 6a is along the optical waveguide 5. A length of the side 6a, as measured from an end on the side of incidence to a point located over the plane-of-polarization rotating element 31, is set in accordance with an application voltage required for phase modulation and a length of the side 6a, as measured from the point located over the plane-of-polarization rotating element 31 to an end on the side of exit, is set in accordance with an application voltage required for polarization scrambling. The second electrode 6B is a rectangular pattern which is disposed on the base plate K so that its periphery is enclosed by the first electrode 6A with a predetermined spacing reserved therefrom. A modulation voltage which is similar to that used in the conventional polarization scrambler is applied to the first electrode 6A, whereas the second electrode 6B is grounded. Accordingly, the electrode pattern functions as phase modulation voltage supplier and as voltage supplier. Though the electrode pattern 6 is described as the microstrip line type, a coplanar strip line may be used as the electrode pattern 6.

In the integrated optical circuit, a signal light transmitted from a light transmitter or the similar apparatus is incident in a condition controlled to a vertical linear polarization (direction of the y axis). The incident signal light is subjected to phase modulation while it is propagated through the optical waveguide 5 to the plane-of-polarization rotating element 31. Operations for the phase modulation are substantially the same as those performed by the conventional phase modulator. The signal light which is subjected to the phase modulation is input into the plane-of-polarization rotating element 31 and its polarization is rotated approximately 45°. Accordingly, the polarization of the signal light which has passed through the plane-of-polarization rotating element is set in a condition where it has x components and y components. This condition is similar to that of a linear polarization of the signal light which is input into the conventional polarization scrambler at an azimuth of approximately 45°. Accordingly, polarization scrambling is performed by propagating the signal light through the optical waveguide 5 disposed subsequently to the plane-of-polarization rotating element 31.

Like the fifth embodiment, the sixth embodiment makes it possible to perform phase modulation and polarization scrambling at the same time with an integrated optical circuit having a simple configuration by selecting a composition for the integrated optical circuit in which the plane-of-polarization rotating element 31 is inserted in the course of the optical waveguide 5 of the straight line type light modulator. However, the sixth embodiment does not provide an effect to reduce polarization dispersion since its polarization scrambling function is equivalent to that of the conventional polarization scrambler. Though the fifth embodiment is more excellent than the sixth embodiment from the viewpoint of reduction of polarization dispersion, the sixth embodiment has a merit to permit applying a voltage for phase modulation and polarization scrambling with a single electrode.

Now, a seventh embodiment will be described below.

The seventh embodiment is an embodiment of an invention defined by claim 7 or is an integrated optical circuit which has an intensity modulation function added to the polarization scrambler preferred, for example, as the first embodiment so that intensity modulation and polarization scrambling can be performed at the same time.

Figure 12:
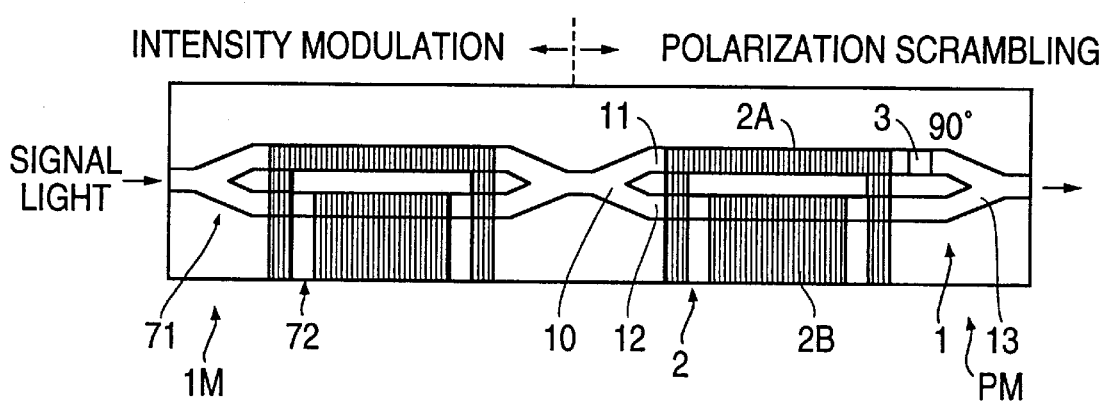
FIG. 12 is a plan view illustrating a seventh embodiment of the integrated optical circuit according to the present invention.

FIG. 12 shows a configuration of the seventh embodiment.

An integrated optical circuit preferred as the seventh embodiment is composed of a polarization scrambler section PM having a composition which is the same as that of the first embodiment and an intensity modulator section IM joined to an incidence side of the polarization scrambler section PM. The intensity modulator section IM has a composition which is the same as that of the ordinary LN type light modulator and has an optical waveguide whose exit end is joined to an incidence end of the polarization scrambler section PM. The composition of the intensity modulator section IM is the same as that of the polarization scrambler section PM from which a plane-of-polarization rotating element 3 is removed. The intensity modulator section IM has an optical waveguide 71 corresponding to the optical waveguide 1 and an electrode pattern 72 corresponding to the electrode pattern 2, and is integrated with the polarization scrambler section PM. Accordingly, the optical waveguide 71 functions as the second splitter, fourth and fifth optical paths and second coupler, whereas the electrode pattern 72 functions as first intensity modulation voltage supplier.

In the integrated optical circuit, a signal light transmitted from a light transmitter or the similar apparatus is controlled to have a vertical linear polarization (direction of the y axis)

and incident onto the optical waveguide 71 of the intensity modulator section IM. The incident signal light is subjected to intensity modulation in accordance with a modulation voltage applied from the electrode pattern 72 while being propagated through the optical waveguide 71. Operations for this intensity modulation are the same as those for intensity modulation performed by the conventional LN type light modulator and will not be described in particular. The signal light having a vertical linear polarization (direction of the y axis) which is subjected to the intensity modulation is shifted into an optical waveguide 1 of the polarization scrambler section PM. In the polarization scrambler section PM, the signal light which has been subjected to the intensity modulation is polarization scrambled by functions which are similar to those of the first embodiment.

The seventh embodiment permits easily obtaining means for performing a combination of the intensity modulation and polarization scrambling proposed for reducing spectral diffusion of a signal light due to polarization scrambling by composing an integrated optical circuit which integrates an intensity modulation function with a polarization scrambling function. Since the composition of the intensity modulator section IM is similar to that of the polarization scrambler section PM in particular, the integrated optical circuit can easily be designed and manufactured. Compared with a case wherein an LN type light modulator is connected to a polarization scrambler, the integrated optical circuit provides effects, like those obtained by the fifth embodiment which integrates the phase modulation function with the polarization scrambling function, to improve optical SNR in a transmission light by reducing a number of optically connected points, eliminate phase adjustment, reduce a number of parts, reduce a number of assembling steps and adopt inexpensive parts, thereby lowering costs for optical transmission systems. In addition, the seventh embodiment makes it possible to configure optical transmission systems compacter by integrating component units.

Figure 13A:
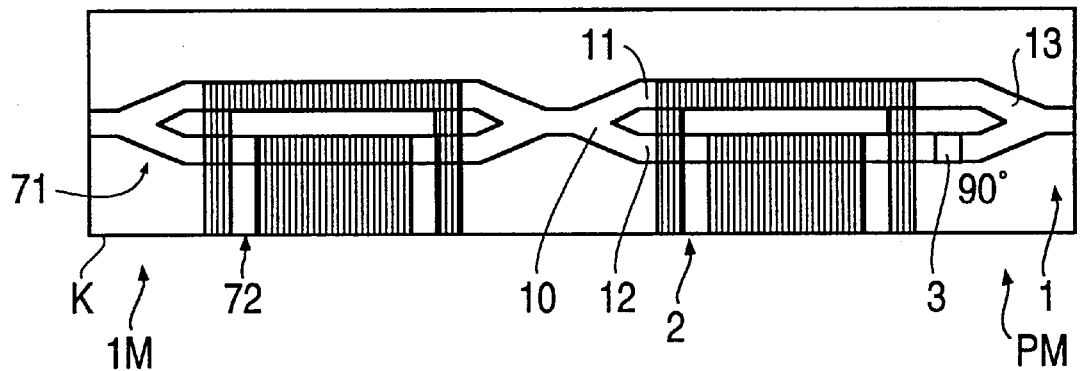
FIGS. 13(A), 13(B) and 13(C) are diagrams exemplifying modifications of a configuration of a polarization scrambler in the seventh embodiment.
Figure 13B:
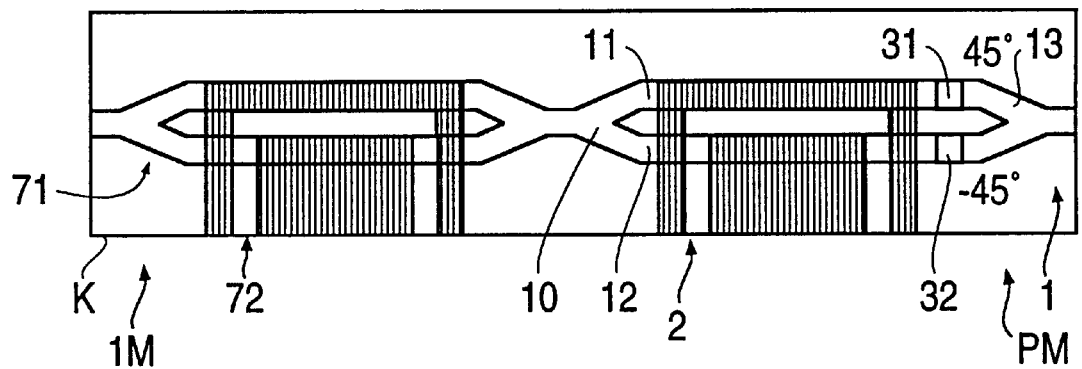
Figure 13C:
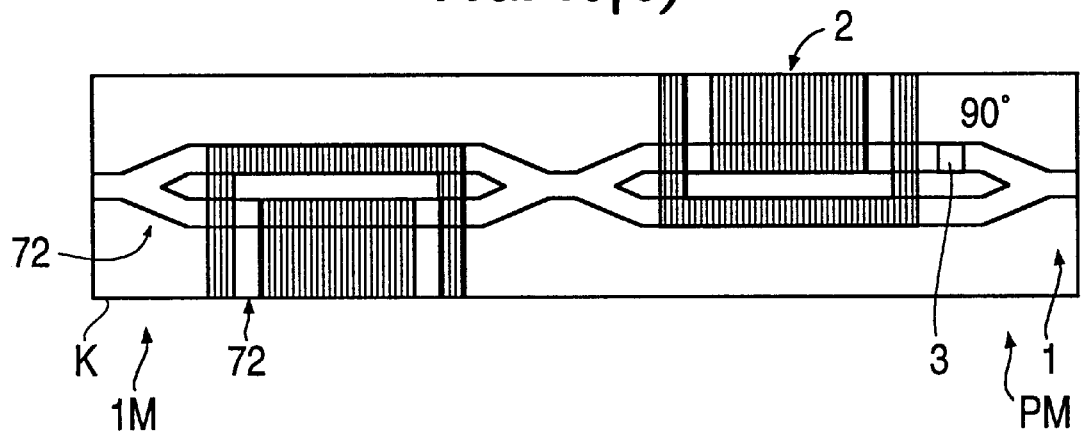
Figure 14A:
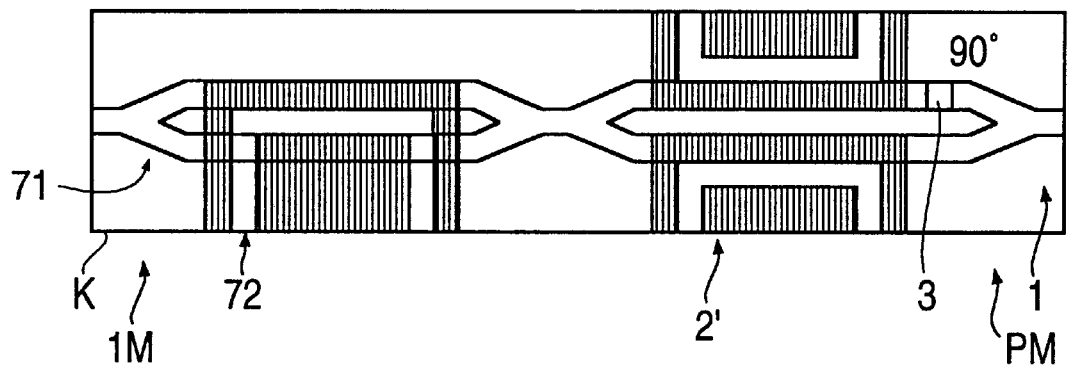
FIGS. 14(A), 14(B) and 14(C) are diagrams exemplifying other modifications of the configuration of the polarization scrambler in the seventh embodiment.
Figure 14B:
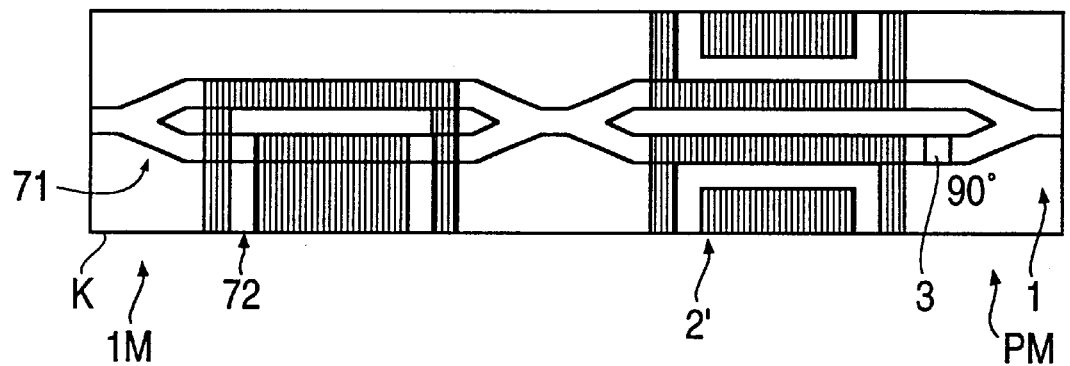
Figure 14C:
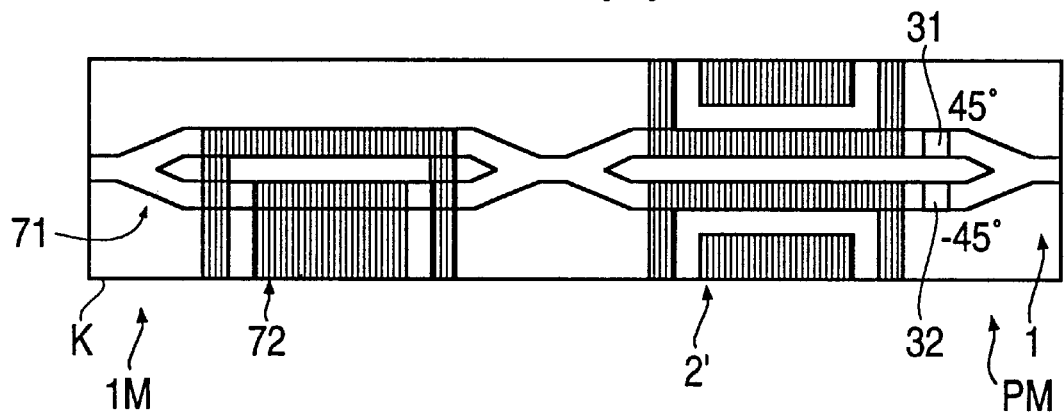

Though the polarization scrambler section PM has a composition wherein the plane-of-polarization rotating element 3 is disposed in the first optical path 11 in the seventh embodiment, the integrated optical circuit according to the present invention is not limited to this composition. The polarization scrambling section PM may have, for example, a composition similar to that of the second embodiment wherein the plane-of-polarization rotating element 3 is disposed in the second optical path 12 as shown in FIG. 13(A) or a composition similar to that of the third embodiment wherein the plane-of-polarization rotating elements 31 and 32 are disposed in the first and second optical paths 11 and 12 respectively as shown in FIG. 13(B). Further, the positional relationship of the electrode pattern 2 of the polarization scrambling section PM relative to the electrode pattern 72 of the intensity modulator section IM in the seventh embodiment may be reversed as shown in FIG. 13(C). Furthermore, it is possible to modify the shape of the electrode pattern 2 of the polarization scrambler section PM into that of the electrode pattern 2' used in the fourth embodiment as shown in FIGS. 14(A) through 14(C). This modification makes it possible to lower power consumption by the polarization scrambler section PM.

Now, description will be made of an eighth embodiment.

The eighth embodiment is an embodiment of an invention defined by claims 10 or 11 and is configured to compose an integrated optical circuit by using the conventional straight line type polarization scrambler in a polarization scrambler section so that it can perform, like the seventh embodiment, intensity modulation and polarization scrambling at the same time.

Figure 15:
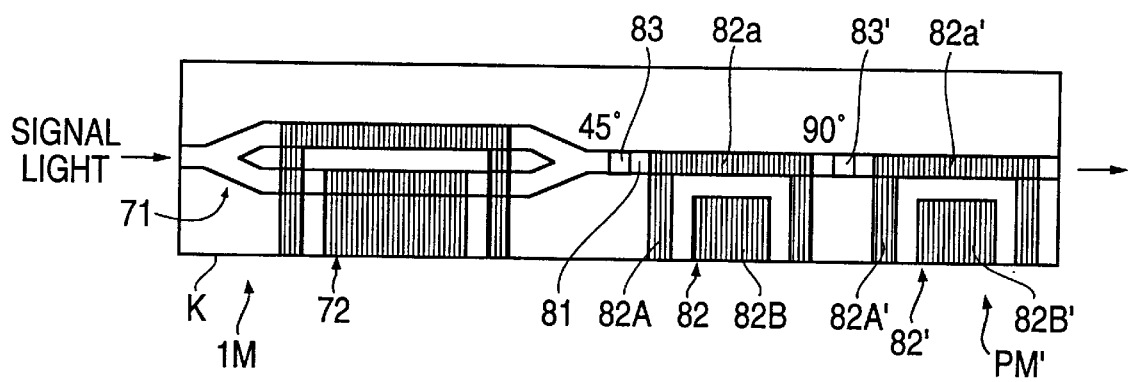
FIG. 15 is a plan view illustrating a configuration of an eighth embodiment of the integrated optical circuit according to the present invention.

FIG. 15 shows a configuration of the eighth embodiment.

An integrated optical circuit preferred as the eighth embodiment is composed, as shown in FIG. 15, of an intensity modulator section IM functioning as intensity modulator like that used in the seventh embodiment and a polarization scrambling section PM' joined to an exit end of the intensity modulator section IM.

The polarization scrambler section PM' is composed of a straight line type optical waveguide 81 formed on a base plate K, two electrode patterns 82 and 82' formed in predetermined shapes on the base plate K, a plane-of-polarization rotating element 83 which is inserted into a joined portion between the optical waveguide 81 and the intensity modulator section IM as first plane-of-polarization rotator for rotating a polarization of an incident light approximately 45° (similar to the plane-of-polarization rotating element 31 used in the third embodiment), and a plane-of-polarization rotating element 83' which is inserted into a middle portion of the optical waveguide 81 as second plane-of-polarization rotator for rotating a polarization approximately 90° (similar to the plane-of-polarization rotating element 3 used in the first embodiment). The optical waveguide 81 is made of a material having an electrooptical effect (such as LN) like the optical waveguide 1 described above. One end of the optical waveguide 81 is joined to an exit end of the optical waveguide 71 of the intensity modulator section IM by way of the plane-of-polarization rotating element 83 and a plane-of-polarization rotator 83' is inserted into a predetermined location of a middle portion of the optical waveguide 81.

Figure 16:
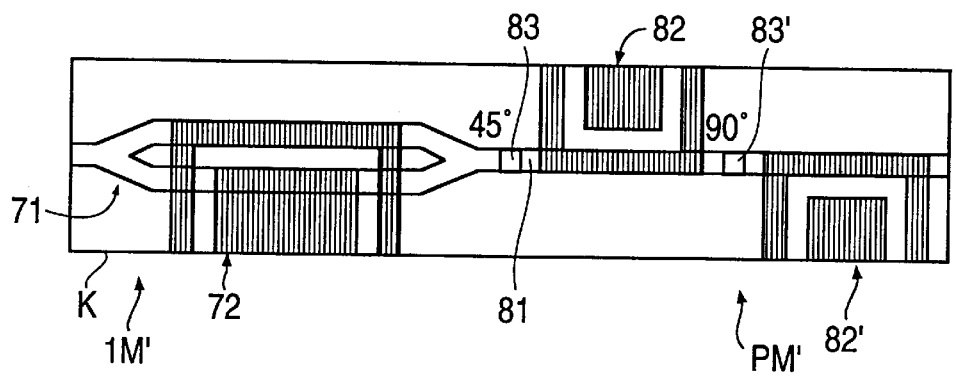
FIG. 16 is a diagram exemplifying disposition of an electrode pattern in the eighth embodiment.

The electrode pattern 82 has two electrodes 82A and 82B. The electrode 82A has a U shape and a side 82a which is disposed on the base plate K so as to be along the optical waveguide 81 between the plane-of-polarization rotating elements 83 and 83'. The electrode 82B is a U-shaped pattern which is disposed on the base plate K so that its periphery is enclosed by the electrode 82A with a predetermined spacing reserved therefrom. An electrode pattern 82' has a shape similar to that of the electrode pattern 82 and a side 82a' which is disposed on the base plate K so as to be along the optical waveguide 81 between the plane-of-polarization rotating element 83' and an exit end of the optical waveguide 81. A modulation voltage which is similar to that used in the conventional polarization scrambler is applied to the electrodes 82A and 82A', whereas the electrodes 82B and 82B' are grounded. Though the electrode patterns are also as the microstrip line type, coplanar strip lines may be used as the electrode patterns. The electrode patterns 82 and 82' may be arranged otherwise, for example, symmetrically as shown in FIG. 16.

The optical waveguide 81 functions as an optical path for the polarization scrambler and as an optical path for a compensating polarization scrambler, the electrode pattern 82 serves as voltage supplier for the polarization scrambler, and the electrode pattern 82' functions as voltage supplier for the compensating polarization scrambler. Further, plane-of-polarization rotating element 83 functions as plane-of-polarization rotator for connecting the intensity modulator to the polarization scrambler, whereas the plane-of-polarization rotating element 83' serves as plane-of-polarization rotator for connecting the polarization scrambler to the compensating polarization scrambler. In the intensity modulator section IM which has the composition similar to that of the seventh embodiment, the optical waveguide 71 functions as splitter of the intensity modulator, the first and second optical paths, and coupler, whereas the electrode pattern 72 serves as intensity modulation voltage supplier.

In the integrated optical circuit, a signal light transmitted from a light transmitter or the similar apparatus is controlled to have a vertical linear polarization (direction of the y axis) and input into the optical waveguide 71 of the intensity modulator section IM for intensity modulation. The signal light having the vertical linear polarization which is subjected to the intensity modulation is input into the plane-of-polarization rotating element 83 and its polarization is rotated approximately 45°. Accordingly, the signal light which has passed through the plane-of-polarization rotating element 83 is set in a condition where it has x components and y components. While passing under the electrode pattern 82, the x components and the y components of this signal light are subjected to phase modulation by functions similar to those of the conventional phase modulator. At this stage, polarization dispersion occurs due to a difference in refractive indices between the x and y directions. For cancelling this polarization dispersion, the plane-of-polarization rotating element 83' converts the x components and the y components by rotating the polarization approximately 90° and phase modulation similar to that described above is performed by passing the signal light under the electrode pattern 82'. Accordingly, the polarization dispersion is cancelled and polarization scrambling is performed.

The eighth embodiment which is configured to compose an integrated optical circuit by integrating the conventional LN type light modulator with the known straight line type polarization scrambler which reduces polarization dispersion provides effects similar to those obtained by the seventh embodiment, or makes it possible to perform intensity modulation and polarization scrambling at the same time with an integrated optical circuit having a simple composition, thereby enabling to improve a transmission characteristic, lower a manufacturing cost and configure optical transmission systems compacter.

Though the optical waveguides are made of litium niobate (LN) in the first through eighth embodiment described above, a material for the optical waveguides used in the polarization scrambler according to the present invention is not limited to litium niobate but the optical waveguides may be made of any material that has an elecrooptical effect.

Further, the present invention is not limited to the embodiments described above and those skilled in the art will understand from the foregoing description that the present invention is modifiable.

What is claimed is:

1. A polarization scrambler comprising:
   a first splitter for splitting an incident signal light into two;
   a first optical path which is made of a material having an electrooptical effect and through which one of the signal light split by said first splitter is propagated;
   a second optical path which is made of a material having an electrooptical effect and through which the other signal light split by said first splitter is propagated;
   a first voltage supplier which applies a voltage to at least one of sections set in said first optical path and said second optical path for varying a phase of a signal light propagated through the section;
   a first coupler which combines signal lights propagated through said first optical path and said second optical path; and
   a first plane-of-polarization rotator which rotates a polarization of the signal light in at least one of said first optical path and said second optical path between said section and said first coupler for adjusting a relative polarization angle between signal lights propagated through said first optical path and said second optical path.

2. A polarization scrambler according to claim 1 wherein said first plane-of-polarization rotator adjusts the relative polarization angle between said signal lights around 90°.

3. A polarization scrambler according to claim 2 wherein said first plane-of-polarization rotator comprises a first rotor in one of said first optical path and said second optical path between said section and said first coupler, and said first rotor rotates a polarization of the signal light approximately 90°.

4. A polarization scrambler according to claim 2 wherein said first plane-of-polarization rotator comprises a second rotor and a third rotor in said first optical path and said second optical path between said predetermined section and said coupler, one of said second rotor and said third rotor rotates a polarization of the signal light approximately 45°, and the other rotor rotates a polarization of the signal light approximately −45°.

5. A polarization scrambler according to claim 1 wherein said first voltage supplier applies voltages having phases reverse to each other to the sections set in said first optical path and said second optical path.

6. An integrated optical circuit using the polarization scrambler as claimed in claim 1 comprising:
   a third optical path which has an end joined to an input end of the first splitter of said polarization scrambler and the other end for propagating an input signal light to said first splitter, and is made of a material having an electrooptical effect; and
   a first phase modulation voltage supplier which applies a predetermined voltage to a predetermined section set in said third optical path for performing phase modulation of a propagated signal light,
   wherein said integrated optical circuit is configured to allow a signal light in a linear polarization condition which has components only in one direction relative to said third optical path, perform phase modulation and polarization scrambling collectively and allow the signal light to emerge from the first coupler of said polarization scrambler.

7. An integrated optical circuit according to claim 1 comprising:
   a second splitter for splitting an incident signal light into two;
   a fourth optical path which is made of a material having an electrooptical effect and through which one of the signal lights split by said second splitter;
   a fifth optical path which is made of a material having an electrooptical effect and through which the other signal light split by said second splitter;
   a first intensity modulation voltage supplier which applies a predetermined voltage to at least one of predetermined sections set in said fourth optical path and said fifth optical path respectively for performing phase modulation of a signal light propagated through the section; and
   a second coupler which has an output end joined to an input end of the first splitter of said polarization scrambler, combines signal lights propagated through said fourth optical path and said fifth optical path, and output a combined signal light,
   wherein said integrated optical circuit is configured to allow signal lights in a linear polarization condition which has components only on one direction relative to said fourth optical path and said fifth optical path, perform intensity modulation and polarization scrambling collectively, and allow the signal light to emerge from the first coupler of said polarization scrambler.

8. An integrated optical circuit comprising:

a phase modulator having an optical path which is made of a material having an electrooptical effect and through which a signal light is propagated, and phase modulation voltage supplier which applies a predetermined voltage to a section set in said optical path for phase modulation of the propagated signal light;

a polarization scrambler having an optical path which is made of a material having an electrooptical effect and through which a signal light is propagated, and a voltage supplier which applies a voltage to a section set in said optical path for varying a phase of the signal light propagated through the section; and a first plane-of-polarization rotator which connects an output end of said phase modulator to an input end of said polarization scrambler, rotates a polarization of a signal light propagated through the optical path of said phase modulator and outputs a signal light in a polarization condition where it has components in two directions.

9. An integrated optical circuit as claimed in claim 8 comprising an electrode which applies a voltage commonly to said phase modulator and said polarization scrambler.

10. An integrated optical circuit comprising:

an intensity modulator comprising splitter for splitting an incident signal light into two, a first optical path which is made of a material having an electrooptical effect and through which one of signal lights split by said splitter is propagated, a second optical path which is made of a material having an electrooptical effect and through which the other signal light split by said splitter is propagated, an intensity modulation voltage supplier which applies a voltage to at least one of sections set in said first optical path and said second optical path for performing phase modulation of the signal light propagated through the section, and a coupler for combining signal lights propagated through said first optical path and said second optical path;

a polarization scrambler having an optical path which is made of a material having an electrooptical effect and through which a signal light is propagated, and a voltage application section which applies a voltage to a section set in said optical path for varying a phase of the signal light propagated through the section; and a first plane-of-polarization rotator which connects an output end of said intensity modulator to an input end of said polarization scrambler, rotates a polarization of a signal light output from the coupler of said intensity modulator, and outputs a signal light in a polarization condition where it has components in two directions to the optical path of said polarization scrambler, wherein said integrated circuit is configured to allow a signal light in a linear polarization condition which has components only in one direction to be incident onto the splitter of said intensity modulator, perform intensity modulation and polarization scrambling of the signal light collectively, and allow the signal light to emerge from said polarization scrambler.

11. An integrated optical circuit according to claim 8 or 10 comprising:

second plane-of-polarization rotator for rotating approximately 90° a polarization of a signal light emerging from said polarization scrambler; and a compensating polarization scrambler having an optical path which is made of a material having an electrooptical effect and through which a signal light output from said second plane-of-polarization rotator is propagated, and a voltage supplier which applies a predetermined voltage to a predetermined section set in said optical path for varying a phase of the signal light propagated through the section, wherein said compensating polarization scrambler is configured to compensate polarization dispersion caused by said polarization scrambler.

* * * * *